(12) United States Patent
Li et al.

(10) Patent No.: US 8,405,273 B2
(45) Date of Patent: Mar. 26, 2013

(54) ELECTRIC MOTOR

(75) Inventors: Yue Li, Hong Kong (HK); Bao Ting Liu, Shenzhen (CN); Ji Dong Chai, Shenzhen (CN); Wen Liang Li, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 35 days.

(21) Appl. No.: 12/485,126

(22) Filed: Jun. 16, 2009

(65) Prior Publication Data

US 2009/0302704 A1 Dec. 10, 2009

(30) Foreign Application Priority Data

Jun. 16, 2008 (CN) .......................... 2008 1 0067856
Jul. 9, 2008 (CN) .......................... 2008 1 0068438

(51) Int. Cl.
*H02K 23/64* (2006.01)

(52) U.S. Cl. ................. 310/158; 310/175; 310/216.025; 310/216.036; 310/269

(58) Field of Classification Search .................. 310/158, 310/175, 162, 164, 216.025–216.029, 216.036–216.037, 310/216.076–216.077, 269, 216.058, 216.033, 310/216.094; *H02K 23/64*
See application file for complete search history.

(56) References Cited

U.S. PATENT DOCUMENTS

| | | | | | |
|---|---|---|---|---|---|
| 479,169 | A | * | 7/1892 | Kennelly | 310/216.033 |
| 507,690 | A | * | 10/1893 | Riker | 310/216.033 |
| 1,181,376 | A | * | 5/1916 | Dilg | 310/40 R |
| 1,569,218 | A | * | 1/1926 | Dake | 310/216.031 |
| 2,340,052 | A | * | 1/1944 | Grimes | 310/77 |
| 2,453,358 | A | * | 11/1948 | Bertea | 310/216.025 |
| 2,601,517 | A | * | 6/1952 | Hammes | 310/172 |
| 2,698,910 | A | * | 1/1955 | Blyth | 310/51 |
| 3,963,949 | A | * | 6/1976 | Church | 310/43 |
| 3,983,621 | A | * | 10/1976 | Donahoo | 29/596 |
| 4,890,528 | A | * | 1/1990 | Kamijima | 84/95.2 |
| 5,081,387 | A | * | 1/1992 | Nystuen | 310/191 |
| 2009/0302704 | A1 | * | 12/2009 | Li et al. | 310/158 |

* cited by examiner

*Primary Examiner* — John K Kim
(74) *Attorney, Agent, or Firm* — Muncy, Geissler, Olds & Lowe, PLLC

(57) ABSTRACT

A universal motor has a stator and a rotor. The stator has stator core and a stator winding. The stator core has a yoke with two ends and two equivalent salient poles formed at the ends of the yoke respectively. The stator winding is wound on the yoke.

1 Claim, 3 Drawing Sheets

ELECTRIC MOTOR

CROSS REFERENCE TO RELATED APPLICATIONS

This non-provisional patent application claims priority under 35 U.S.C. §119(a) from Patent Application No. 200810067856.5 filed in The People's Republic of China on Jun. 16, 2008, and Patent Application No. 200810068438.8 filed in The People's Republic of China on Jul. 9, 2008.

FIELD OF THE INVENTION

The present invention relates to electric motors and in particular to a stator for a universal motor.

BACKGROUND OF THE INVENTION

Universal motors have a wound stator and a wound rotor with the rotor windings being electrically connected to the stator windings via brushes and a commutator. The windings may be connected in series (series wound) or in parallel (shunt wound). A universal motor, in theory, may run on DC power or single phase AC power. In practice, the universal motor is more suited for use with a single phase AC supply. Due to this kind of motor having high rotation speed, small volume, light weight, big starting torque, convenient speed control, and series excitation characteristic, it is widely used in medical devices, power tools, and electrical appliances, etc., which require low output power, high speed, small volume and light weight, such as vacuum cleaners, domestic sewing machines, electric drills, and other portable electric tools.

Universal motors have stators with either salient poles or non-salient poles. In conventional salient pole type universal motors, stator windings are wound about neck portions of the salient poles of the stator core. However, due to the neck portions of the stator pole being usually comparatively wide, each turn of the stator winding is long, which results in waste of materials. In conventional non-salient pole type universal motors, stator windings are wound on the yoke of the stator core which is comparatively narrow. However, the reluctance of the stator core is such that the magnetic field is not uniform across the poles and is concentrated in the portion of the pole closest to the stator windings with the other side of the pole carrying little magnetic flux. This results in an unbalance in the magnetic field which adversely affects motor performance, such as poor motor commutation, excessive sparking and reduced motor life. A salient pole may be described as a pole which clearly stands out from the yoke of the stator core. This is emphasized by the neck portion about which the stator winding is often wound. A non-salient pole is a pole which merges with the yoke and is difficult to determine where the pole begins and the yoke ends. The non-salient pole does not have a neck portion. As such the non-salient pole allows the yoke to locate closer to the rotor resulting in a smaller overall dimension of the motor, at least in the direction across the stator poles.

SUMMARY OF THE INVENTION

Accordingly, the present invention provides a universal motor comprising a wound stator, and a wound rotor, the stator comprising a stator core and a stator winding, the stator core comprising a yoke having two ends and two stator poles, wherein the stator poles are equivalent salient poles formed at respective ends of the yoke, and the stator winding is wound on the yoke.

Preferably, each stator pole comprises a neck portion extending inwardly from the corresponding end of the yoke in the radial direction of the rotor, and a pole shoe extending inwardly from the neck portion and extending in the circumferential direction of the rotor, the pole shoe having a pole face which confronts the rotor, the pole face being disposed completely inward of the ends of the yoke in the radial direction of the rotor.

Preferably, the yoke is U-shaped.

Preferably, the width of the yoke is less than the width of the neck portion.

Preferably, each pole shoe has two ends viewed in the circumferential direction of the rotor, and the angle formed by the end of the pole shoe remote from the stator winding, measured in a plane perpendicular to the rotational axis of the rotor, is greater than the angle formed by the end of the pole shoe adjacent to the stator winding, measured in the same plane.

Alternatively, each stator pole is formed with a plurality of separate magnetic flux barriers, the spacing between adjacent magnetic flux barriers remote from the stator winding are greater with that between adjacent magnetic flux barriers closer to the stator winding, measured in the circumferential direction of the rotor.

Preferably, at least a part of the pole face of each pole extends into the end of the yoke, in the radial direction of the rotor.

Preferably, the magnetic flux barriers are holes extending through the poles in a direction parallel to the axis of rotor.

Preferably, the holes have circular or elliptical cross sections.

Preferably, in each stator pole, the edges of each of the holes, at the point closest to the pole face, are equally spaced from the pole face.

Preferably, the rotor comprises rotor windings that are connected to the stator winding via a commutator.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DESCRIPTION OF THE PREFERRED EMBODIMENT

Figure 1:
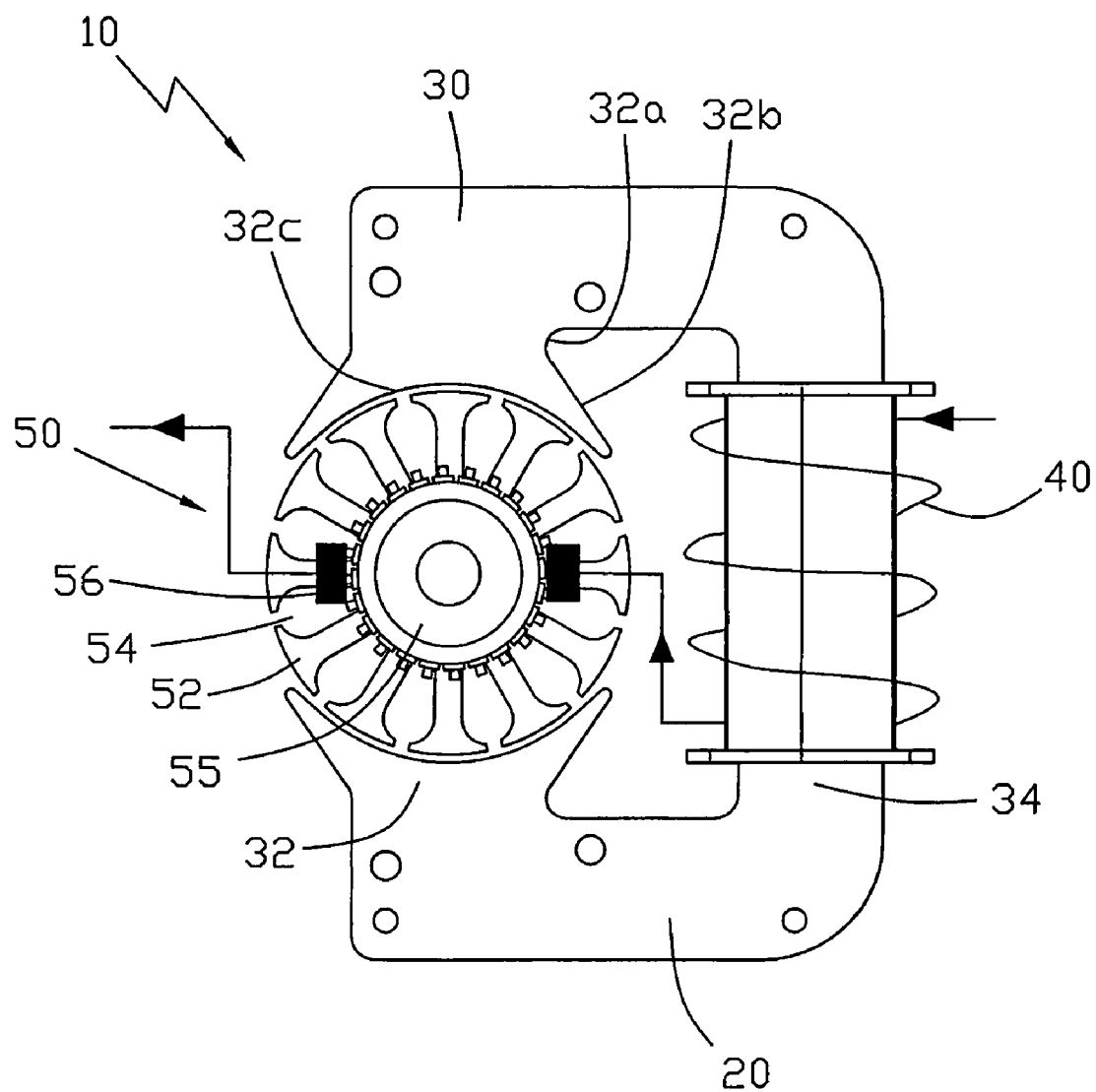
FIG. 1 is a schematic diagram of a side view of a motor in accordance with a first embodiment of the present invention.

As shown in FIG. 1, the first embodiment of the present invention provides a universal motor 10 comprising a stator 20 and a rotor 50. The stator 20 comprises a stator core 30 and a stator winding 40. The stator core 30 comprises two salient stator poles 32 facing the rotor 50 there between, and a U-shaped yoke 34 connecting the two stator poles 32. The yoke 34 has a base portion and two arm portions extending from the base portion and extending about the rotor. Each salient stator pole 32 comprises a comparatively narrow neck portion 32a, and a pole shoe extending from the neck portion 32a. The pole shoe has an arcuate pole face 32c facing the rotor 50 and has two circumferentially spaced ends 32b which extend circumferentially beyond the neck portion. The rotor 50 is located in the spaced between the pole faces of the two poles 32. The pole face 32c completely extends beyond the edge of the yoke 34 in the radial direction of the rotor 50. The width of the neck portion 32a is greater than the width of the yoke 34. The stator winding 40 is wound on the yoke 34.

The rotor 50 comprises a rotor core having a plurality of teeth 52 forming rotor poles and slots 54 located between adjacent teeth 52. Rotor windings (not shown) are wound about the teeth 52 and electrically connected to the stator winding 40 and/or power supply by a commutator 55 and brushes 56.

Figure 2:
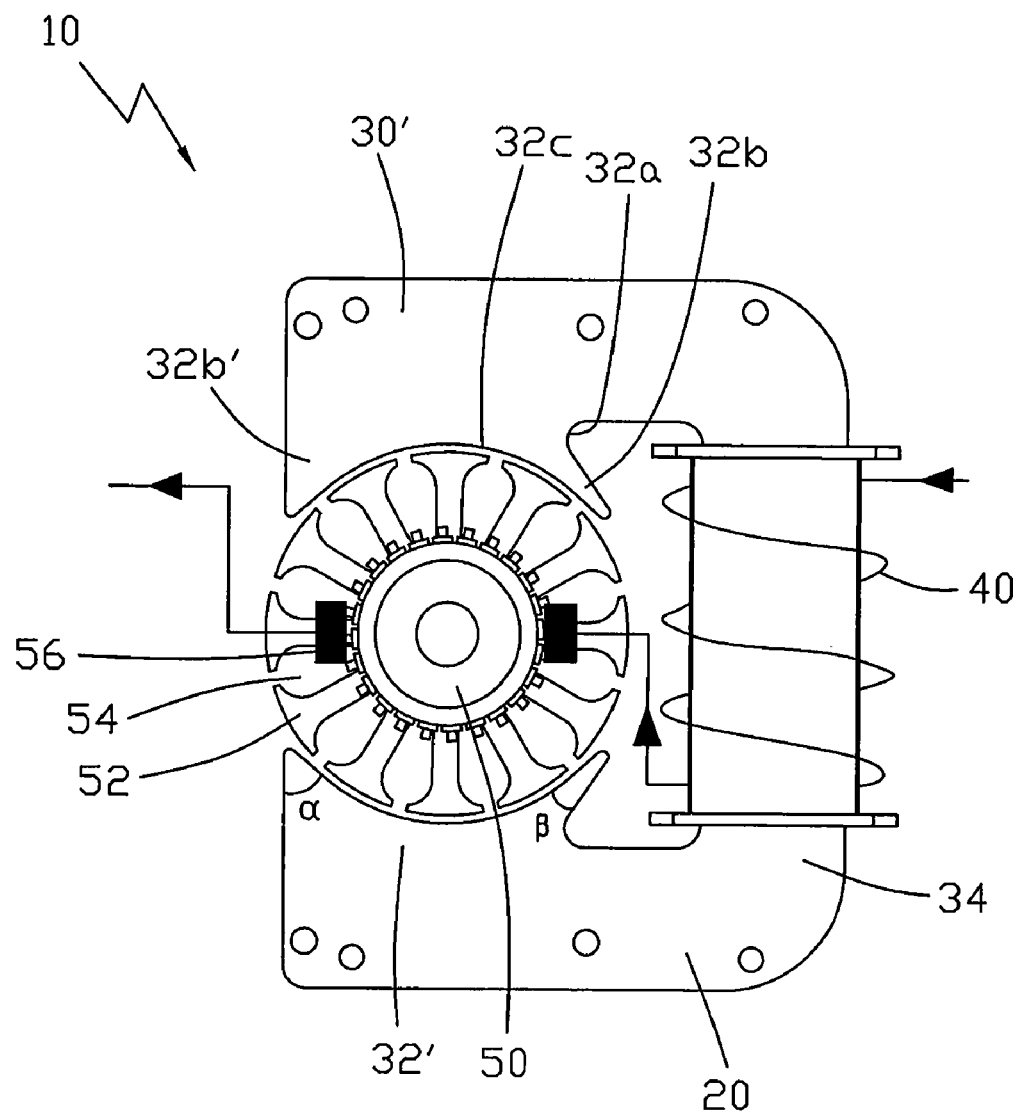
FIG. 2 is a schematic diagram of a side view of a motor in accordance with a second embodiment of the present invention.
Figure 3:
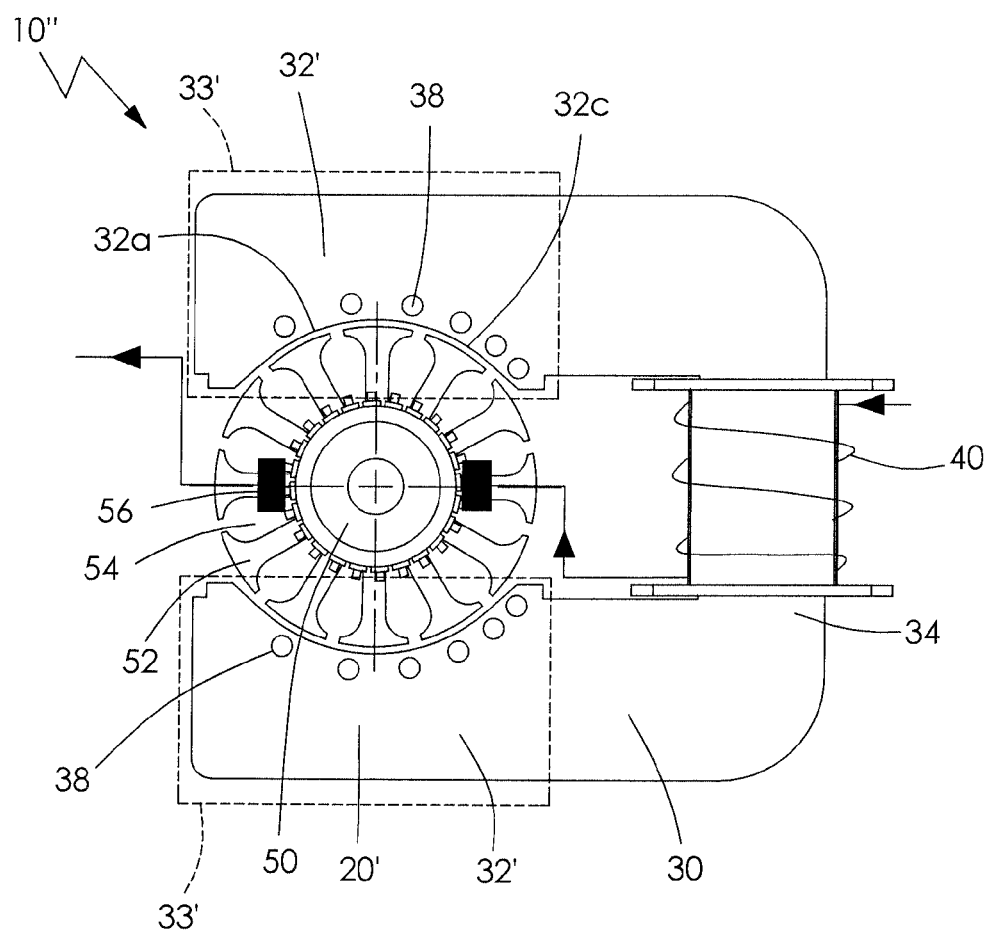
FIG. 3 is a schematic diagram of a side view of a motor in accordance with a third embodiment of the present invention.

Another embodiment of the present invention, as shown in FIG. 2, provides a universal motor 10' which is similar to the universal motor 10 of FIG. 1. The main difference between the motors 10 and 10' is that in the universal motor 10', the angle α formed by a first end of the pole shoe 32b' remote from the stator winding 40 in the plane perpendicular to the rotational axis of the rotor 50, is greater than the angle β formed by the second end of the pole shoe 32b adjacent to the stator winding 40 in the same plane. Usually, the reluctance of the magnetic path through the pole shoes close to the stator winding is less than that of the path through the pole shoes further away from the stator winding, as the length of the path is shorter. In the second embodiment, the design that the angle α formed by the first end of the pole shoe 32b' remote from the stator winding 40 is greater than the angle β formed by the second end of the pole shoe 32b adjacent to the stator winding 40 will reduce the difference in the magnetic reluctance between the ends of the pole shoes 32b and 32b', whereby the magnetic flux produced by the stator winding 40 when energized, will more uniformly passing through the rotor 50.

In the above mentioned embodiments of the present invention, the stator winding 40 is wound on the yoke 34 which is usually narrower than the neck of the salient stator pole. Thus, the length of each turn of the stator winding is shortened when compared with conventional universal motor in which the stator winding is wound on the neck of the salient pole of the stator core. Therefore, material is saved and cost is reduced.

F*ig.* 3 shows a universal motor 10" in accordance with a third embodiment of the present invention. The universal motor 10" comprises a stator 20' and a rotor 50. The stator 20' comprises a stator core 30, and a stator winding 40 wound in the stator core 30. The stator core 30 comprises a U-shaped yoke 34 having two arms extending from a base. Each arm has a distal end 33' forming a non-salient stator pole 32'. Each stator pole 32' is formed with an inner concave surface forming the pole face 32a which faces or confronts the rotor 50. The rotor 50 is received in a space defined by the pole faces 32a. Each stator pole 32' is formed with a plurality of separate magnetic flux barriers 38 arranged along the circumferential direction of the rotor 50. The magnetic flux barriers 38 extend through the pole 32' in the axial direction of the rotor. The further away from the stator winding 40 the magnetic flux barriers 38 are, the greater the interval between adjacent magnetic flux barriers 38. As explained before, the magnetic reluctance of the end of the pole closest to the stator winding is usually less than that of the end of the pole away from the stator winding. In the third embodiment, the design of the interval or spacing between adjacent magnetic flux barriers disposed in the poles nearer to the stator winding 40 is less than the interval or spacing between adjacent magnetic flux barriers disposed in the poles away from the stator winding 40 which will reduce the difference in the reluctance of the magnetic paths through the poles 32' along the circumferential direction of the rotor 50, whereby the magnetic flux produced by the stator winding 40 when electrified, will more uniformly pass through stator poles to the rotor 50.

In the third embodiment, the two poles 32' of the stator 20 are non-salient poles when no magnetic flux barriers are formed therein. At least a part of pole face 32a of the stator poles 32' extend into the ends of the arms of the yoke in the radial direction of the rotor. However, with the provision of the magnetic flux barriers 38, the poles 32' of the stator 20 function as salient poles.

In the present invention, salient poles in which the pole face completely extends beyond the ends of the yoke in the radial direction of the rotor such as in the first and second embodiments and non-salient poles functioning as salient poles such as in the third embodiment are all known as equivalent salient poles.

Preferably, the magnetic flux barriers 38 are through holes. The holes may have a circular, elliptical or other suitable cross section. Preferably, the line connecting the edges of the holes of the flux barriers 38, at the closest point to the pole face 32a is coaxial or parallel with the shape of the pole surface 32a. That is, in each pole the edge of the holes forming the flux barriers are equally spaced from the pole face.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A universal motor comprising a wound stator, and a wound rotor, the stator comprising a stator core and a stator winding, wherein the stator core comprises a U-shaped yoke having a base and two arms extending from the base, each arm has a distal end remote from the base and forming a non-salient stator pole, each stator pole is formed with an inner concave surface forming a pole face which faces the rotor; each stator pole is formed with a plurality of separate magnetic flux barriers adjacent the pole face and arranged in the circumferential direction of the rotor, the spacing between adjacent magnetic flux barriers remote from the stator winding are greater than that between adjacent magnetic flux barriers closer to the stator winding, measured in the circumferential direction of the rotor, the magnetic flux barriers are void holes extending through the poles in a direction parallel to the axis of the rotor, and in each stator pole, the edges of each of the void holes, at the point closest to the pole face, are spaced equidistant from the pole face.

* * * * *